United States Patent [19]

Klemann et al.

[11] Patent Number: 4,959,465

[45] Date of Patent: Sep. 25, 1990

[54] LOW CALORIE FAT MIMETICS

[75] Inventors: Lawrence P. Klemann, Somerville; John W. Finley, Whippany; Anthony Scimone, Cedar Grove, all of N.J.

[73] Assignee: Nabisco Brands, Inc., East Hanover, N.J.

[21] Appl. No.: 160,851

[22] Filed: Feb. 26, 1988

[51] Int. Cl.$^5$ .................. A23D 3/00; A23D 5/00; C11C 3/00
[52] U.S. Cl. .................. 536/115; 426/611; 426/612
[58] Field of Search .................. 426/611, 612; 536/115

[56] References Cited

U.S. PATENT DOCUMENTS

| | | | |
|---|---|---|---|
| 2,874,175 | 2/1959 | Feuge et al. | 426/611 |
| 2,962,419 | 11/1960 | Minich | 426/531 |
| 3,579,548 | 5/1971 | White | 260/410.7 |
| 3,600,186 | 8/1971 | Mattson et al. | 426/611 |
| 4,508,746 | 4/1985 | Hamm | 426/601 |
| 4,582,715 | 4/1986 | Volpenhein | 426/611 |
| 4,582,927 | 4/1986 | Fulcher | 426/531 |
| 4,656,045 | 4/1987 | Bodor et al. | 426/611 |
| 4,673,581 | 6/1987 | Fulcher | 426/612 |
| 4,830,787 | 5/1989 | Klemann et al. | 426/611 |
| 4,840,815 | 6/1989 | Meyer et al. | 426/611 |
| 4,849,242 | 7/1989 | Kershner | 426/611 |
| 4,861,613 | 8/1989 | White et al. | 426/611 |

FOREIGN PATENT DOCUMENTS 1106681 8/1981 Canada .

OTHER PUBLICATIONS

Lipids, 2 H. J. Deuel Interscience Publishers, Inc., New York, 1955, p. 215.
Deuel, H. J., A. L. S. Cheng and M. G. Morehouse Journal of Nutrition 35, pp. 295–300 (1948).
F. H. Mattson, Journal of Nutrition 69 pp. 338–342 (1959).
Ward, Gros and Feuge, New Fat Products: Glyceride Esters of Adipic Acid JAOCS, vol. 36, pp. 667–671 (1959).
Hamm, D. J. Preparation and Evaluation of Trialkoxytricarballylate, Trialkoxycitrate, Trialkoxyglycerylether, Jojoba Oil and Sucrose Polyester as Low Calorie Replacements of Edible Fats and Oils, J. of Food Science, vol. 49 (1984) pp. 419–428.

*Primary Examiner*—Ronald W. Griffin

[57] ABSTRACT

Novel fat mimetic compositions are disclosed as reduced calorie food components. These compositions comprise complex polyol esters elaborated with fatty acid residues, and/or residues of esters or ethers having an acid function. The complex esters are partially broken down in the body to yield at least two types of aliphatic digestion residues which are more hydrophilic than the original complex polyol ester substrate. The majority by weight of the digestion residues will be non-hydrolyzable by the normal digestive processes, while a minor amount by weight may be susceptible to facile cleavage by the action of digestive lipase. The fat mimetic compounds are useful as replacements for fats and oils for most food applications.

18 Claims, No Drawings

LOW CALORIE FAT MIMETICS

BACKGROUND OF THE INVENTION

The present invention relates to edible fat mimetic materials, and especially to new compounds having a desireable combination of properties and their use in edible compositions.

Obesity is perceived as a common problem in contemporary society. This condition is due, in many people, to a greater intake of calories than are expended. While genetic and behavioral factors play a major role, it is generally agreed that reasonable modifications of the caloric value of foods can be valuable in reaching a more desirable equilibrium weight for an individual predisposed to obesity.

Many foods which provide gustatory satisfaction contain significant fat levels. This can be a problem for individuals drawn to these foods because fat has about twice the caloric density of protein and carbohydrates. It has, in fact, been estimated that fat contributes about 40% of the total calories in the diet. It has long been desired to reduce the available calories of dietary fat without decreasing the appeal or satiety expected of fatty foods. It has been reported that this would offer a convenient and practical method by which obesity could be controlled, ideally without requiring a dieter to restrict total food intake.

Unfortunately, of the materials heretofore suggested as fat replacements, few have all of the desirable attributes of natural triglyceride fats and oils. One approach to lower the caloric value of edible fat has been to decrease the amount of triglyceride that is absorbed in the human system since the usual edible triglyceride fats are almost completely absorbed (see *Lipids*, Vol. II [1955], H. J. Deuel, Interscience Publishers, Inc., New York, page 215). The absorbability of triglyceride fat could be decreased by altering either the alcohol or the fatty acid portion of the molecule. There have been some experiments that have demonstrated a decrease in absorbability with certain fatty acids; for example, erucic acid (H. J. Deuel, A. L. S. Cheng, and M. G. Morehouse, *Journal of Nutrition*, Vol. 35 [1948], page 295, and stearic acid if present as tristearin (F. H. Mattson, *Journal of Nutrition*, Vol. 69 [1959], page 338). Also, U.S. Pat. No. 2,962,419, to Minich discloses that fatty acid esters which contain a neopentyl nucleus are not digested like normal fats and thus can be used as a fat substitute in food compositions.

Several other patents disclose edible compounds which are not digested or absorbed to the same extent as natural triglycerides. In U.S. Pat. No. 3,579,548, White discloses certain glycerol esters of certain branched carboxylic acids which are said to have these properties. And, in U.S. Pat. No. 3,600,186, Mattson and Volpenhein disclose sugar and sugar alcohol fatty acid esters having at least four fatty acid ester groups. All of these compounds are said to possess physical properties similar to ordinary triglyceride fat, but to be absorbed less readily when eaten. It is, unfortunately, this very attribute which causes undesirable and potentially embarrassing side effects, including the frank anal discharge of the materials.

In a greater departure from conventional glyceride ester chemistry, Canadian Pat. No. 1,106,681 to Trost discloses glycerol dialkyl ether compounds which are said to have functional properties similar to those of conventional fats, but which are not absorbed in the digestive tract to any significant degree. Also, Ward, Gros and Feuge have reported in New Fat Products: Glyceride Esters of Adipic Acid; *JAOCS*, Vol. 36 [1959], page 667, that highly viscous oils formed by reacting two glycerol molecules with a diabasic acid, such as fumaric, succinic and adipic acids, and then reacting one of the hydroxyl groups of each glycerol moiety with a fatty acid, are useful in the food industry, primarily as lubricants and coatings.

In U.S. Pat. No. 4,508,746, Hamm discloses a low-calorie substitute for at least a portion of the edible oil component in oil-based food compositions which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. See also D. J. Hamm; Preparation and Evaluation of Trialkoxytricarballylate, Trialkoxycitrate, Trialkoxyglycerylether, Jojoba Oil, and Sucrose Polyester as Low Calories Replacements of Edible Fats and Oils; J. of Food Science, Vol. 49 [1984], pages 419–426.

In another attempt at simulating the natural properties of fat, Fulcher discloses certain diesters in U.S. Pat. No. 4,582,927. These compounds have at least two carboxylate groups joined to a common carbon atom, with each of the carboxylate groups containing the residue of a 12 to 18 carbon alkyl, alkenyl or dienyl alcohol.

One of the main problems in attempting to formulate fat-like compounds that have decreased absorbability and thus low caloric properties is to maintain the desirable and conventional physical properties of edible fat. Thus, to be a practical low calorie fat, a compound must mimic conventional triglyceride fat by affording the same utility in various fat-containing food compositions such as shortening, margarine, cake mixes, and the like, and be useful in frying or baking. Unfortunately, none of the prior attempts has been successful to the degree that commercial products employing them have either been approved for safety or achieved general public acceptance in their featured role.

Among the problems with some non-absorbable fat-like materials is the possibility that they will leach fat-soluble vitamins and minerals from the body and that they function, when used in larger amounts, as purgatives. Many attempts have been made to solve these and related problems; however, a better solution would employ chemistry more compatible with the human digestive process, while providing a significant decrease in caloric density vis-a-vis glyceride fats.

SUMMARY OF THE INVENTION

The present invention provides a new class of fat mimetic compounds, new food compositions which contain them, and the process of employing these compounds in food compositions. The new fat mimetic materials are complex polyol esters elaborated with fatty acid residues, and/or residues of esters or ethers having an acid function. The complex polyol esters may be partially broken down in the body to yield at least two types of aliphatic digestion residues which are more hydrophilic than the complex esters. The majority by weight of the digestion residues will be non-hydrolyzable by the normal digestive processes, while a minor amount by weight are susceptible to facile cleavage by the action of digestive lipase. The fat mimetic compounds are useful as replacements for fats and oils for most food applications.

The fat mimetic compounds can be defined by the following formula:

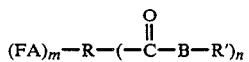

wherein FA represents a fatty acyl residue; R represents a polyol residue; m is zero or an integer from 1 to 7; n is an integer from 1 to 7; B is —$(CH_2)_j$—O—,

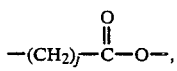

or

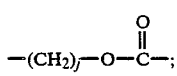

and the R' groups can be the same or different and can comprise residues defined by the following formula:

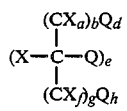

where:
C=a carbon atom;
X=a bridging bonding valence, hydrogen, or substituted or unsubstituted lower aliphatic group (e.g., $C_1$-$C_4$), the various X groups being the same or different;

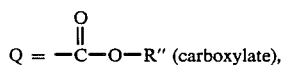

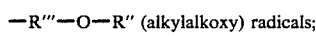

R″=Substituted or unsubstituted organic group, defined by the formula

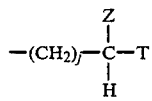

R‴=Lower alkylene, desireably methylene or ethylene, preferably methylene group;
the various R', R″, and R‴groups, respectively, being the same or different;
T=Hydrogen or a substituted or unsubstituted aliphatic group, preferably up to 22 carbons, containing 0 to 5 unsaturated linkages (e.g., C=C double bonds, C≡C triple bonds) per T residue;
Z=a bridging bonding valence, hydrogen, or an alcohol, glycol ester of the formula

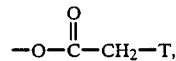

ether, or the like, residue; with the proviso that there is only one bridging bonding valence per R' group;
and where:
a=0 to 3, preferably 0 to 2;
b=0 to 4, preferably 0 to 1;
d=1 or 2;
e=0 to 5, preferably 1 to 2;
f=0 to 3, preferably 0 to 2;
g=0 to 4, preferably 0 to 1;
h=1 or 2;
j=0 to 10, preferably 0 to 3.

Preferably, each R group will contain from 1 to 3, most desirably 2, Q radicals.

The complex polyol esters may be partially broken down in the body to yield digestion residues which, preferably, are each more hydrophilic than the complex polyol ester substrate. The majority by weight of the digestive residues will be non-hydrolyzable by normal digestive processes, while a minor amount by weight may be susceptible to facile cleavage by the action of digestive enzymes. The selection of the exact type of chemical bonds which will provide the desired proportions of hydrolytically reactive versus "inert" sites is determined by experiment.

The compounds are employed in any edible material or any food preparation process where a fat or oil (i.e., triglyceride fat) is normally employed, in total or partial replacement.

By judicious selection of the structural type, molecular size and the number of acid residues, it is possible to achieve a target reduction in calories while preferably achieving the maximum advantage from the combination of the properties of these mimetics.

DETAILED DESCRIPTION

The following description relates to a new class of fat mimetic compounds and their incorporation into any food composition or use in conjunction with any edible material. The term "edible material" is broad and includes anything edible, whether or not intended for nutrition, e.g., it can be an additive such as an antioxidant for fats or oils, an antispatter agent, an emulsifier, or other minor functional ingredient. Thus, chewing gum, flavored coatings, oils and fats intended only for frying, and the like are included. In these, all or a portion of the usual fat is replaced by a compound of the invention.

Representative of edible materials which can contain the fat mimetic compounds of the invention in full or partial replacement of natural fat are: frozen deserts, e.g., sherbet, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as containing peanut butter or chocolate; chewing gum; bakery products, e.g., cakes, breads, rolls, pastries, cookies, biscuits, savory crackers; mixes or ingredient premixes for any of these; as well as flavor, nutrient, drug or functional additive delivery systems.

The complex polyol esters of the invention can be employed in margarine substitutes which can be either soft or hard. Margarines are generally sold at one of two principal types, namely: (1) print, hard or stick margarine, and (2) soft or tub margarine. All of these products contain liquid and hard stock components. It is an advantage of the present invention that, by eliminating some or all of the hard stock of conventional margarines, higher ratios of polyunsaturated to saturated fatty acids and lesser amounts of trans isomers can be achieved in high quality margarine products.

The fat mimetic compounds of the invention will be referred to as "complex polyol esters". The complex polyol esters of the present invention include at least two distinct types of acid residues, namely, fatty acid (i.e., acyl) residues and residues of esters having an acid function. These complex polyol esters can be defined by the following general formula:

$$(FA)_m-R-(-\overset{O}{\underset{\|}{C}}-B-R')_n$$

wherein FA represents a fatty acyl residue; R represents a polyol residue, m is zero or an integer from 1 to 7 and n is an integer from 1 to 7, m preferably being from 4 to 6 and n preferably being from 1 to 4, the sum of m+n preferably being from 5 to 8; B is —(CH$_2$)$_j$—O—, $$-(CH_2)_j-\overset{O}{\underset{\|}{C}}-O-, \text{ or } -(CH_2)_j-O-\overset{O}{\underset{\|}{C}}-;$$

and the R' groups can be the same or different and can comprise residues of the following structure:

$$(X-\overset{(CX_a)_bQ_d}{\underset{(CX_f)_gQ_h}{\overset{|}{\underset{|}{C}}}}-Q)_e$$

where:

C = a carbon atom;

X = a bridging bonding valence, hydrogen, or substituted or unsubstituted lower aliphatic (e.g., C$_1$-C$_4$), the various X groups being the same or different;

$$Q = -\overset{O}{\underset{\|}{C}}-O-R'' \text{ (carboxylate)},$$

—R'''—$\overset{O}{\underset{\|}{C}}$—O—R'' (alkylcarboxylate), —O—$\overset{O}{\underset{\|}{C}}$—R'' (carboxy), —R'''—O—$\overset{O}{\underset{\|}{C}}$—R'' (alkylcarboxy); —O—R'' (alkoxy), or —R'''—O—R'' (alkylalkoxy) radicals;

R'' = Substituted or unsubstituted organic group defined by the formula $$-(CH_2)_j-\overset{Z}{\underset{H}{\overset{|}{\underset{|}{C}}}}-T$$

R''' = Lower alkylene, desireably methylene or ethylene, preferably methylene group;

the various R', R'', and R''' groups, respectively, being the same or different;

T = Hydrogen or a substituted or unsubstituted aliphatic group, preferably up to 22 carbons, containing 0 to 5 unsaturated linkages (e.g., C=C double bonds, C≡C triple bonds) per T residue;

Z = a bridging bonding valence, hydrogen, or an alcohol, glycol ester of the formula $$-O-\overset{O}{\underset{\|}{C}}-CH_2-T,$$

with the proviso that there is only one bridging bonding valence per R' group;

and where:

a = 0 to 3, preferably 0 to 2;
b = 0 to 4, preferably 0 to 1;
d = 1 or 2;
e = 0 to 5, preferably 1 to 2;
f = 0 to 3, preferably 0 to 2;
g = 0 to 4, preferably 0 to 1;
h = 1 or 2;
j = 0 to 10, preferably 2 to 8.

Preferably, each R' group will contain from 1 to 3, most desirably 2, Q radicals.

The complex polyol esters may be partially broken down in the body to yield digestion residues which, preferably, are each more hydrophilic than the complex polyol ester substrate. The majority by weight of the digestive residues will be non-hydrolyzable by normal digestive processes, while a minor amount by weight may be susceptible to facile cleavage by the action of digestive enzymes. The selection of the exact type of chemical bonds which will provide the desired proportions of hydrolytically reactive versus "inert" sites is determined by experiment.

The polyol residue (R) of the complex polyol esters of the invention can be obtained by employing any aliphatic or carbocyclic, including polycyclic, polyol with sufficient hydroxy substitution to form non-toxic esters. Representative of these polyols are lower aliphatic polyols, sugar alcohols, sugars, trisaccharides, oligosaccharides, and hydrogenated starch hydrolysates. Among the lower aliphatic polyols are glycerol, propylene glycol, butylene glycol, butene diol, butene triol and tris (hydroxymethyl) ethane. Among the monosaccharides are glucose, fructose, mannose, galactose, xylose, arabinose, ribose, and sorbose. Among the disaccharides are sucrose, maltose and lactose. Among the sugar alcohols are erythritol, xylitol, sorbitol and other sugar alcohols from hexoses and pentoses. Suitable trisaccharides and oligosaccharides are those derived by the acid, alkaline or enzymatic hydrolysis of pentosan, cellulose, hemicellulose, chitin, chitosan or other polysaccharides. These starch hydrolysates can also be modified chemically or enzymatically, such as by hydrogenating to form hydrogenated starch hydrolysates or enzymatically to form cyclodextrins. The preferred polyols will have molecular weights of less than 1000, and more narrowly from about 90 to about 400.

A suitable polyol is sucrose which has eight hydroxyl groups, which permits up to eight acid residues to be incorporated. Sucrose or other polyol esters which have zero to six "normal" fatty acid residues, derived from reactions between sucrose (or other polyol) and fatty acid or fatty acid ester, can be employed as starting materials. These starting materials esters are desirably substantially non-digestible under the kinetics normally existing in the human body. An additional one to five complex acid residues are also esterified with the remaining free hydroxyls on the sucrose (or other polyol) backbone. These complex acid residues preferably undergo cleavage by the action of digestive lipase so as to leave the sucrose core significantly more hydrophilic in character than the original substrate complex polyol ester compounds of the invention.

The fatty acid can be fatty acid residues which are preferably derived from natural fat or similar or other carboxylic acids. The more readily digestible fatty or other carboxylic acid residues can be a highly desirable essential acid or a nutritionally advantageous carboxylic acid such as: oleic, linoleic, linolenic, eicosapentaenoic acids, as well as low molecular weight carboxylic acids (e.g., acetic, propionic, butyric acids). Also suitable are other fatty acids having from about 8 to 22 carbon atoms. Examples of such fatty acids are caprylic, capric, lauric, myristic, myristoleic, palmitic, palmitoleic, stearic, ricinoleic, eleostearic, arachidic, behenic, and erucic. The fatty acids can be derived from suitable naturally occurring or synthetic fatty acids and can be saturated or unsaturated, including positional and geometric isomers, depending on the desired physical properties, e.g., liquid or solid, of the fat compound.

Fatty acids per se or naturally occurring fats and oils can serve as the source for the fatty acid component in the complex polyol ester. For example, rapeseed oil provides a good source for $C_{22}$ fatty acids. $C_{16}$ to $C_{18}$ fatty acids can be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. Among the fatty acids, those that are preferred have from about 14 to about 18 carbon atoms, and are most preferably selected from the group consisting of myristic, palmitic, stearic, oleic, and linoleic. Thus, natural fats and oils which have a high content of these fatty acids represent preferred sources for the fatty acid components, e.g., soybean oil, olive oil, cottonseed oil, corn oil, tallow and lard.

Where the Q groups are carboxylate, alkylcarboxylate, alkoxy, or alkylalkoxy, they can be residues of fatty alcohols having saturated or unsaturated aliphatic groups (i.e., $R''$) with at least 5 carbons. Preferred fatty alcohols are oleyl, linoleyl, linolenyl, stearyl, palmityl, myristyl, lauryl, capryl, eicosapentaenyl, and the like. The preferred fatty alcohols can be of similar chain lengths and configurations to the fatty acids described above.

The particular types of fatty acids and alcohols can be selected to achieve the desired texture (both solid and liquid) and melt characteristics in the compound. Blends of complex polyol esters with each other and/or with natural fats and oils and/or other fat mimetic materials such as sucrose polyesters can be selected for a desired melt profile and mouthfeel. This is especially desirable in the case of margarine substitutes, cookie fillings, whipped toppings, etc.

Among the complex polyol esters preferred for many applications are those with melting points below about 98° F. because these material melt completely in the mouth providing the organoleptic sensation of natural fats and oils. For some products, relatively sharp melting points, say in the range of from about 90° to 98° F., are desired because they provide a cooling sensation and a meltdown equivalent to high quality, solid natural fats.

The following is a list of representative, but non-limiting, examples of $R'$ groups which can form part of the acyl residue suitable for forming the complex polyol esters of the invention:

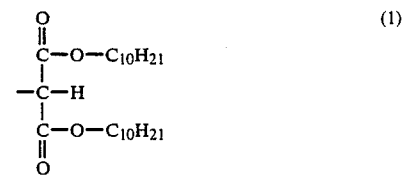
(1)

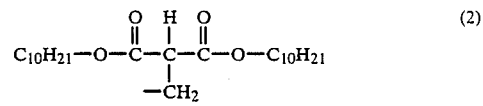
(2)

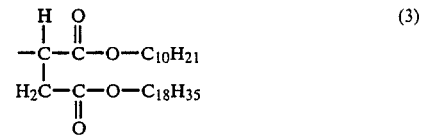
(3)

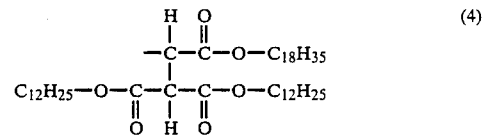
(4)

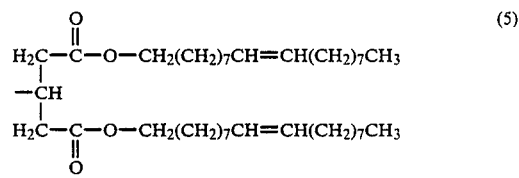
(5)

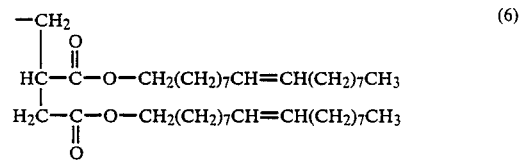
(6)

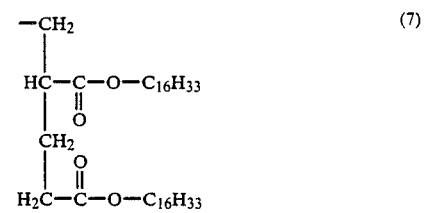
(7)

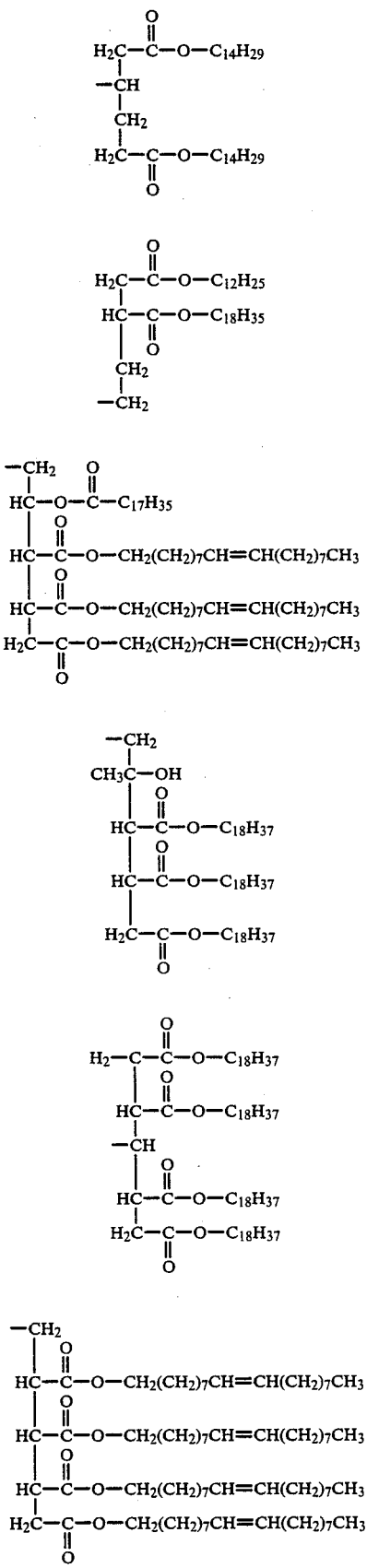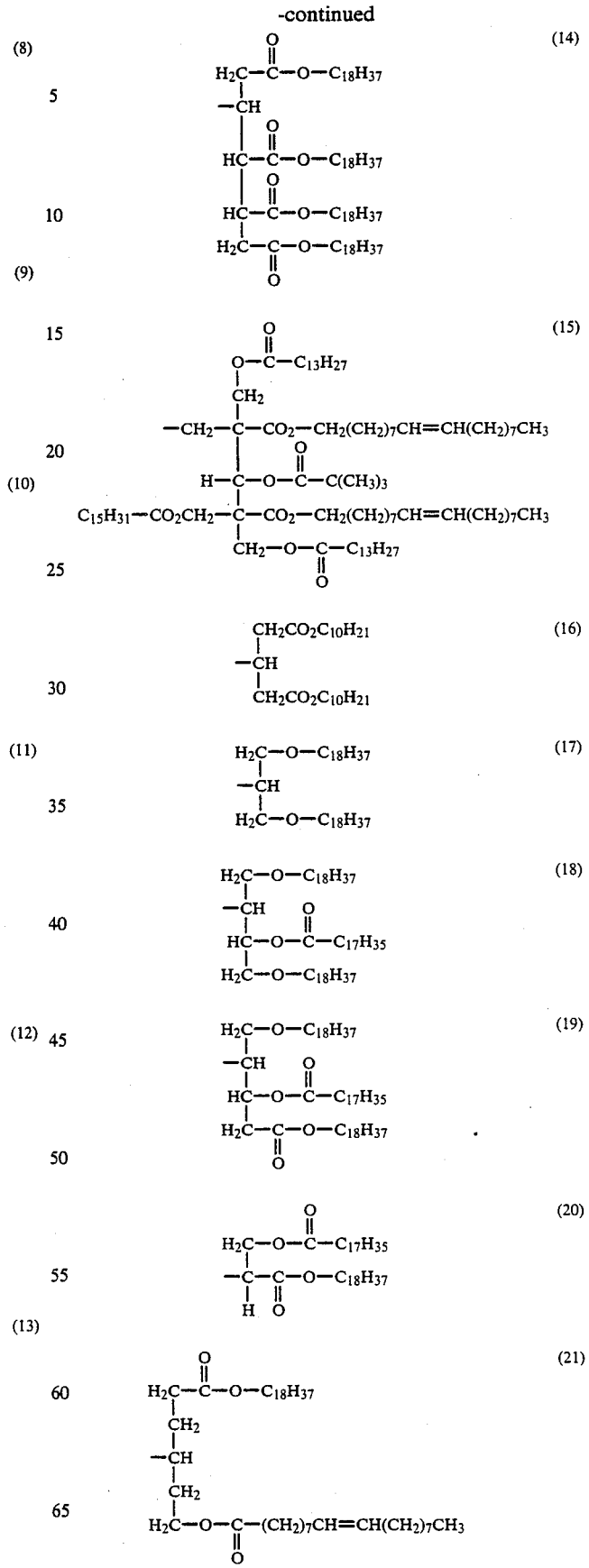

-continued

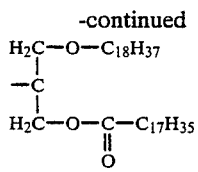 (22)

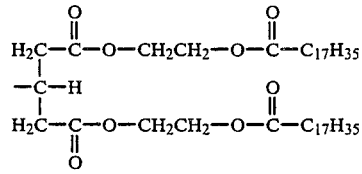 (23)

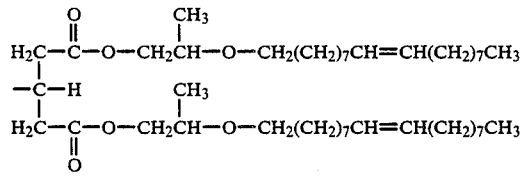 (24)

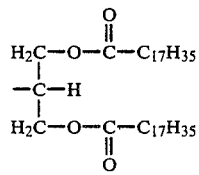 (25)

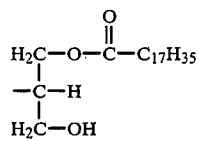 (26)

The following is a list of representative

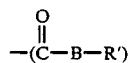

groups according to the above formula:

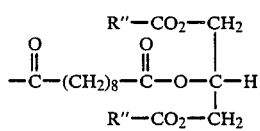 (27)

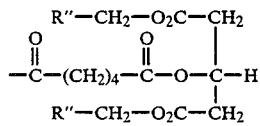 (28)

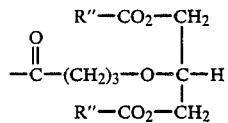 (29)

In these structures, the R" is as defined above and the open valence on each carbonyl functionality represents the point of covalent attachment to a polyol (R) "core". Residues (27) and (28) represent the respective products or reactions between adipic acid and either a normal sn-1,3-diglyceride or a structurally related 3-hydroxy-glutarate, while residues (29) can be prepared by reaction of a sn-1,3-diglyceride with gamma-butyrolactone.

Such "triglyceride-like" residues desirably undergo hydrolysis by the action of digestive lipase.

For the purpose of example, consider the enzymatic hydrolysis of a sucrose fatty acid adduct which is functionally substituted with residue (29) (as defined above). Such a reaction is given in the Equation below:

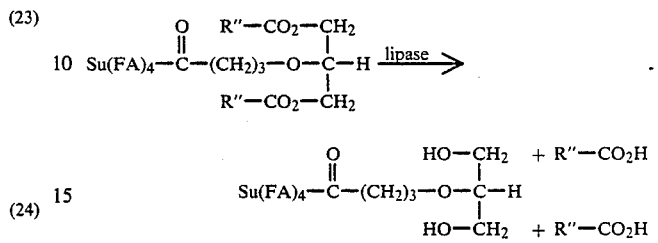

In this reaction, Su is Sucrose, and FA and R"—$CO_2$(H) are fatty acids such as oleic acid. The complex polyol ester substrate on the left side of the equation has six fatty acid groups per sucrose, while the larger of the digestive products on the right has only four such groups, and a new monoglyceride-like function attached to the sucrose core. Two of the available six fatty acid groups have been released (about 3 calories/g) to produce a surface active sucrose ester product having hydroxy replacing the removed fatty acid components. Where branching groups are appropriately incorporated into the "R" component of the released fatty acids, the caloric release from enzymatic hydrolysis of the complex polyol ester substrate could be molecularly engineered to approach zero calories/g. Alternatively, enzymatic hydrolysis of a similarly substituted composition carrying residue (28) would be expected to yield two products (a sucrose ester capped with free carboxylic acid groups, and a diglyceride-like structure) both with surface active character, and once again virtually zero calories/g.

The goal, then, is to apend enzymatically reactive functional groups onto sucrose and related polyhydroxylated carbocyclic cores which contain a substantial excess of "inert" fatty acid chains.

Where, by virtue of any of these factors, more of the pendant groups are metabolized, the caloric value of the fat mimetic compound will increase. The most preferred compounds will contribute at least one third, typically from one half to ninety percent, less calories than conventional glyceride fats.

The fatty acid residues (FA) shown in the above general formula are preferably derived from natural fat. The more readily digestible carboxylic acid residues can be a highly desirable essential acid or a nutritionally advantageous carboxylic acid such as: oleic, linoleic, linolenic, eicosapentaenoic acids, as well as low molecular weight carboxylic acids (e.g., acetic, propionic, butyric acids) which would limit caloric delivery and provide additional ability to control functionality. The product of such a controlled digestive process may be said to have decreased hydrophobicity, and correspondingly increased hydrophilicity, relative to its fat mimetic precursor. Such a product of a process of controlled digestion tends to have not only decreased oiliness, but also increased ability to function as an emulsifier. Such a controlled digestion product will be less prone to exist in the GI tract as a persistent oil compared with substances taught in the prior art. Ideally, the enhanced emulsifying capacity of the enzymatic cleavage product derived from compositions of the invention would actually be an aid to digestion, substantially overcoming a major problem which has heretofor limited the widespread use and development of highly desirable low calorie synthetic fats and oils in foods and food preparation.

During the synthetic process which leads to these new compositions, moieties may be introduced sequentially to afford an array of structures with well-defined functional and isomeric characteristics. This logical molecular assembly process also allows for the use of natural or synthetic blends of such carboxylic acids and aliphatic alcohols, as well as carboxylic acids and aliphatic alcohols which contain substantial levels of chain branching.

Another advantage offered within the scope of the present invention is to enable the construction of novel molecules and fat mimetics whose molecular weights, and melting ranges, and viscosity properties may be engineered at the molecular level so as to fall within the same desirable ranges found for natural fats and oils, so as to closely emulate the properties and the functionality of natural fats and oils used in food products.

The following examples are presented to further illustrate and explain the present invention and should not be taken as limiting in any regard. Unless otherwise indicated, all parts and percentages are by weight.

EXAMPLE 1

This example shows the preparation, from intermediates to final molecular composition, of a fat mimetic material of the invention.

Mono-(dioleyl glutar-3-ylate) succinate. A 500-mL round bottom flask, containing a magnetic stirrer bar, is charged with 62.2g (0.096 mole) dioleyl 3-hydroxyglutarate, 13.8g (0.14 mole) succinic anhydride, 3.2g (0.026 mole) 4-(dimethylamino)pyridine and 200 mL of anhydrous pyridine. The resulting solution is stirred at ambient temperature for three days, and is poured into 1500 mL of water. This mixture is extracted with 4×400 mL portions of diethyl ether, and the combined extracts are washed with 5% aqueous HCl, and are dried over anhydrous $Na_2CO_3$. After filtration, the volatiles are removed on a vacuum rotary evaporator (45 degrees C and 100 Torr, then ambient temperature and 2 Torr). The yield of yellow oil is 58g (82% of theory). The product is characterized by IR and NMR spectroscopy: IR, neat: 3.33-3.45 microns (very broad, OH); 5.76 (strong, C=O ); 6.29 (weak, C=C); 8.62 (strong, C-O); proton NMR, chloroform-d: 0.88 ppm (triplet, 6H, —$CH_3$); 1.30 (multiplet, 40H, —$CH_2$—); 1.61 (quintet, 4H, —O—$CH_2$—$CH_2$—$CH_2$—); 2.01 (multiplet, 8H, C=C—$CH_2$—); 2.65 (apparent doublet of doublets, 4H, O=C—$CH_2$—$CH_2$—C=O); 2.71 (doublet, 4H, O=C—$CH_2$—CH—$CH_2$—C=O); 5.35 (multiplet, 4H, HC=CH); and 5.53 (quintet, 1H, —$CH_2$—CH—$CH_2$—), 11.26 (broad singlet, 1H, —$CO_2H$).

Elemental Analysis: Calc. for $C_{45}H_{80}O_8$, FW 749.12: C 72.15, H 10.76; Found: C 72.15, H 10.87.

Mono-(dioleyl glutar-3-yl) succinoyl monochloride. A portion of the above acid ester (58.0 g, 0.0793 mole) and 200 mL of thionyl chloride are charged to a 500-mL round bottom flask, containing a magnetic stirrer bar, and fitted with a drying tube filled with Drierite. The reaction mixture is stirred at room temperature for 24 hours, whereupon the volatiles are removed on a vacuum rotary evaporator (60 degrees C. and 100 Torr) to afford 59g (99%) of a dark brown, viscous oil, whose structure is supported by its NMR spectrum: NMR, chloroform-d: 0.88 ppm (triplet, 6H, $CH_3$); 1.30 (multiplet, 40H, $CH_2$); 1.61 (quintet, —O—$CH_2$—$CH_2$—$CH_2$—); 2.01 (multiplet, 8H, C=C—$CH_2$); 2.65 and 3.20 (apparent triplets, 2H and 2H, O=C—$CH_2$—$CH_2$—C=O); 2.72 (doublet, 4H, O=C—$CH_2$—CH—$CH_2$—C=O); 4.07 (triplet, 4H, O—$CH_2$); 5.35 (multiplet, 4H, HC=CH); and 5.56 (quintet, 1H, $CH_2$—CH—$CH_2$).

Elemental Analysis: Calc. for $C_{45}H_{79}C_{1}O_7$, FW 767.57: C 70.42, H 10.37, Cl 4.62; Found: C 67.69, H 10.01, Cl 7.30. The elemental analysis, including the higher than expected value determined for chlorine is consistent with product contamination with 0.57 wt % (or 4.1 mole %) thionyl chloride.

Three-to-one adduct between mono-(dioleyl glutar-3-ylate) succinoyl mono-chloride and sucrose dioleate. In a dry, 50-mL, single neck flask containing a magnetic stirrer bar and fitted with a vacuum stopcock, are combined 8.71 g (0.01 mole) sucrose oleate (with an average oleic acid:sucrose ratio of two) and a 15.35 g portion (0.03 mole) of mono-(dioleyl glutar-3-ylate) succinoyl monochloride prepared above. The flask is sealed and placed under vacuum while being heated to 110 degrees C. by means of an oil bath. The mixture is heated with stirring for sufficient time to yield substantial conversion of reactants to product. After cooling to ambient temperature, the product is characterized by proton NMR spectroscopy (in chloroform-d). The result is consistent with formation of the expected 3:1 adduct between the triester acid chloride and the sucrose diester.

EXAMPLE 2

Adduct between cis-2-butene-1,4-diol and two equivalents of mono(dioleyl glutar-3-ylate) succinate. To a solution of 2.27 g (0.011 mole) 1,3-dicyclohexylcarbodiimide in 30 mL of methylene chloride is added a solution of mono-(dioleyl glutar-3-ylate) succinic acid (7.48 g, 0.010 mole), 1.22 g (0.01 mole) 4-dimethylaminopyridine and 0.44 g (0.005 mole) cis-but-2-en-1,4-diol in 30 mL diethyl ether. Within minutes, a precipitate forms. After standing at room temperature for 16 hours, the mixture is filtered and the filtrate is diluted with 100 mL of ether. The solution is washed with 2×50 mL portions of 5% HCl followed by 50 mL of aqueous NaCl and is filtered and dried over anhydrous sodium sulfate. After filtration, solvent is removed on a vacuum rotary evaporator. The product oil is passed through a 0.45 micron filter to remove any remaining particulate matter. The product is obtained as a clear, yellow oil, which is characterized spectroscopically: proton NMR, chloroform-d: chemical shift in ppm (multiplicity, intensity, assignment): 0.87 (triplet, 12 H, $CH_3$), 1.30 (multiplet 88 H, $CH_2$), 1.60 (apparent quintet, 8 H, O—$CH_2$—$CH_2$—$CH_2$), 2.01 (apparent quartet, 16 H, C=C—$CH_2$), 2.60 ($A_2B_2$ multiplet, 8 H, O=C—$CH_2$—$CH_2$—C=O), 2.71 (doublet, 8 H, O—CH—$CH_2$—C=O), 4.05 (triplet, 8 H, O—$CH_2$), 4.69 (doublet J=6.68 Hz, 4 H, C=C—$CH_2$—O), 5.35 (multiplet, 8 H, oleyl HC=CH), 5.51 (quintet, 2 H, methine-H) and 5.73 (triplet J=4.05 Hz, 2 H, cis-2-butene HC=CH). Carbon-13 NMR, chloroform-d: 14.4, 15.7, 22.5, 25.8, 27.1, 28.3, five peaks closely spaced between 28.5-29.8, 32.0, 32.5, 38.1, 60.2, 65.0, 65.9, 67.4, 124.0, 129.8, 129.9, 170.0, 171.1 and 171.9.

EXAMPLE 3

Adduct between Sucrose Distearate and three Equivalents of mono-(dioleyl glutar-3-ylate) succinate. A powdered sample of sucrose distearate (1.80 g, 0.002 mole), 4.48 g (0.006 mole) of mono-(dioleyl glutar-3-ylate) succinate, a catalytic amount of 4-(dimethylamino) pyridine and 40 mL of dry tetrahydrofuran (THF) are combined and this solution is added to a solution of 1.40 g (0.007 mole) dicyclohexylcarbodiimide in 10 mL THF. After standing for 36 hours at ambient temperature, the precipitate which forms is removed by filtration. Diethyl ether (300 mL) is added to the filtrate, which is washed with 5% aqueous HCl then with water, and finally dried over anhydrous sodium sulfate. Filtration and evaporation affords a residue which is dissolved in a minimum of ether. This solution is passed through a Millipore filter, and upon evaporation yields a yellow, oily semi-solid. Examination of this material by proton NMR in chloroform-d confirms the title structure: chemical shift in PPM (multiplicity, intensity, assignment): 0.87 (triplet, 18 H, $CH_3$), 1.27 (overlapping multiplets, 188 H, $CH_2$), 1.61 (multiplet, 16 H, oleyl O—$CH_2$—$CH_2$ and stearyl O=C—$CH_2$—$CH_2$), 1.70–1.81 (overlapping multiplets, about 3 H, unresolved sucrose peaks), 2.00 (multiplet, 24 H, C=C—$CH_2$), 2.32 (broad multiplet, 4 H, stearyl O=C—$CH_2$), 2.65 (singlet, 12 H, O=C—$CH_2$—$CH_2$—C=O), 2.70 (doublet, 12 H, O=C—$CH_2$—CH—$CH_2$—C=O), 3.64 (very broad singlet, about 8 H, sucrose protons), 4.05 (triplet, 12 H, oleyl —O—$CH_2$), 4.32 (very broad singlet, about 6 H), sucrose protons), 5.33 (multiplet, 12 H, HC=CH) and 5.49 (quintet, 3 H, O=C—$CH_2$—CH—$CH_2$—C=O); this data shows the presence of two stearyl groups and three complex succinate residues per sucrose unit in this novel fat mimetic composition.

EXAMPLE 4

Filled Cream. About 18 Kg of a fat mimetic (mp 32 to 35 degrees C.) of Example 1 is homogenized with 82 Kg of skim milk in a conventional dairy homogenizer to afford a "filled cream" composition.

EXAMPLE 5

Ice Cream. The "filled cream" composition of Example 4 (68 parts) is combined with 15 parts condensed skim milk, 15 parts sugar, 0.5 parts gelatin, 1.0 part flavor, and 0.25 parts color to produce an ice cream mix which is processed in the normal manner to yield a modified ice cream product.

EXAMPLE 6

Filled Milk. About 100 parts of the filled cream composition prepared in Example 4 is combined with about 620 parts of skim milk to prepare a "filled milk" composition.

EXAMPLE 7

Cheese Products. The filled milk product obtained in Example 6 is treated like natural milk in the normal cheese making process (as is practiced, for example in the production of cheddar or swiss cheese). Preferably 10% butter oil is added to the fat mimetic portion of the filled milk product before it is employed in this process to enhance the proper flavor development of the cheese products.

EXAMPLE 8

Butter cream icing is prepared by blending:

| Ingredient | g. |
|---|---|
| Sugar | 227.0 |
| Fat mimetic of Example 1 | 70.8 |
| Water | 28.4 |
| Non-Fat Dry Milk | 14.0 |
| Emulsifier (used with di-alkyl glycerol ether blend only) | 1.4 |
| Salt | 1.0 |
| Vanilla | 1.0 |

All of the ingredients are creamed in a mixer at medium speed.

EXAMPLE 9

Vanilla Wafers. Twenty-five parts of a (plastic) fat mimetic are blended with 100 parts flour, 72 parts granulated sugar, 5 parts high fructose corn syrup, 1 part non-fat dry milk, 1 part salt, 1/10 part ammonium bicarbonate, 1 part dried egg yolk, 1/10 part sodium bicarbonate, and 55 parts water. The dough so formed is rolled, wire cut to ¼ inch thickness, and baked by the usual process to give a vanilla wafer cookie.

The above description is for the purpose of teaching the person of ordinary skill in the art how to practice the present invention and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. A fat mimetic composition having the following formula:

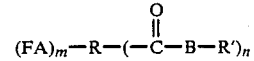

wherein
FA represents a fatty acyl residue;
R represents polyol residue;
m is zero or an integer from 1 to 7;
n is an integer from 1 to 7; and further
B is selected from the group consisting of

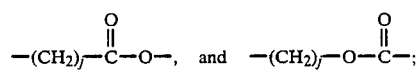

and the R' groups are the same or different and contain residues of the following structure:

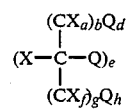

where:
C is a carbon atom;
X is a bridging bonding valence, hydrogen, or substituted or unsubstituted lower aliphatic group, the various X groups being the same or different;
Q is selected from the group consisting of

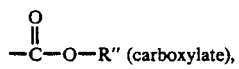 (carboxylate),

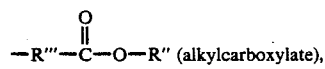 (alkylcarboxylate),

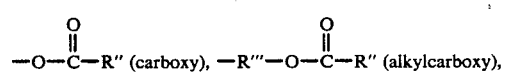

—O-R" (alkoxy), and —R'"—O-R" (alkylalkoxy) radicals;

R" is substituted or unsubstituted organic group defined by the following formula

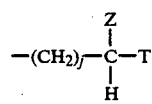

R'" is a lower alkylene; group;
the various R', R", and R'" groups, respectively, being the same or different;
T is hydrogen or a substituted or unsubstituted aliphatic group;
Z is a bridging bonding valence, hydrogen, or a residue of an alcohol, a glycol ester, or an ether; with the proviso that there is only one bridging bonding valence per R' group;
and where:
a=0 to 3;
b=0 to 4;
d=1 or 2;
e=0 to 5;
f=0 to 3;
g=0 to 4;
h=1 or 2;
j=0 to 10.

2. A compound according to claim 1 wherein the sum of m=n is in the range of from 5 to 8.

3. A compound according to claim 1 wherein n is in the range of from 1 to 3.

4. A compound according to claim 1 wherein each R' contains from 1 to 3 Q groups.

5. A compound according to claim 1 wherein at least one Q is carboxylate or alkylcarboxylate.

6. A compound according to claim 1 wherein at least one Q is carboxy or alkylcarboxy.

7. A compound according to claim 1 wherein at least one Q is alkoxy or alkylalkoxy.

8. A compound according to claim 1 wherein R is a member selected from the group consisting or residues of sucrose, glucose, xylitol and sorbitol.

9. A compound according to claim 8 wherein m is an integer from 4 to 6 and n is an integer from 1 to 4.

10. A compound according to claim 9 wherein the sum of m=n is within the range from 5 to 8.

11. A compound according to claim 10 wherein R is a sucrose residue.

12. A compound according to claim 10 wherein each R' contains at least 2 Q groups.

13. A compound according to claim 10 wherein at least one Q is carboxy or alkylcarboxy.

14. A compound according to claim 10 wherein at least one Q is carboxylate or alkylcarboxylate.

15. A compound according to claim 10 wherein at least one Q is alkoxy or alkylalkoxy.

16. A fat mimetic composition according to claim 1 wherein:
a=0 to 2;
b=0 to 1;
e=1 to 2;
f=0 to 2;
g=0 to 1;
j=2 to 8.

17. A fat mimetic composition according to claim 1 wherein the alkylene is selected from the group consisting of methylene and ethylene.

18. A fat mimetic composition according to claim 1 wherein T is hydrogen or a substituted or unsubstituted aliphatic group containing up to 22 carbon atoms and further containing 0 to 5 unsaturated linkages per T residue.

* * * * *